United States Patent
Foltin

(10) Patent No.: US 9,827,956 B2
(45) Date of Patent: Nov. 28, 2017

(54) METHOD AND DEVICE FOR DETECTING A BRAKING SITUATION

(71) Applicant: Robert Bosch GmbH, Stuttgart (DE)

(72) Inventor: Johannes Foltin, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/363,975

(22) PCT Filed: Oct. 9, 2012

(86) PCT No.: PCT/EP2012/069965
§ 371 (c)(1),
(2) Date: Jun. 9, 2014

(87) PCT Pub. No.: WO2013/083313
PCT Pub. Date: Jun. 13, 2013

(65) Prior Publication Data
US 2015/0120160 A1 Apr. 30, 2015

(30) Foreign Application Priority Data
Dec. 9, 2011 (DE) ........................ 10 2011 088 130

(51) Int. Cl.
*G06K 9/36* (2006.01)
*B60T 8/171* (2006.01)
*B60W 30/095* (2012.01)
*G08G 1/16* (2006.01)
*B60Q 9/00* (2006.01)
*G06K 9/20* (2006.01)
*G06K 9/46* (2006.01)
(Continued)

(52) U.S. Cl.
CPC .............. *B60T 8/171* (2013.01); *B60Q 9/008* (2013.01); *B60W 30/0956* (2013.01); *G06K 9/00825* (2013.01); *G06K 9/2054* (2013.01); *G06K 9/4652* (2013.01); *G08G 1/166* (2013.01); *B60T 2201/022* (2013.01); *B60W 30/16* (2013.01); *B60W 2420/42* (2013.01); *G06K 9/00791* (2013.01)

(58) Field of Classification Search
None
See application file for complete search history.

(56) References Cited

U.S. PATENT DOCUMENTS 6,335,682 B1 * 1/2002 Bates et al. .................... 340/479
6,985,073 B1 * 1/2006 Doan ...................... B60Q 1/525
340/425.5
7,365,769 B1 * 4/2008 Mager .......................... 348/113
(Continued)

FOREIGN PATENT DOCUMENTS

DE 199 06 614 10/1999
DE 102 54 806 6/2004
(Continued)

*Primary Examiner* — Thomas G Black
*Assistant Examiner* — Demetra Smith-Stewart
(74) *Attorney, Agent, or Firm* — Norton Rose Fulbright US LLP; Gerard Messina

(57) ABSTRACT

A method for detecting a braking situation of a vehicle located on a traffic route, which has a task of ascertaining a red component of at least one image area of an image which depicts at least one section of the traffic route, and includes a task of determining the braking situation based on the red component.

13 Claims, 3 Drawing Sheets

(51) Int. Cl.
*B60W 30/16* (2012.01)
*G06K 9/00* (2006.01)

(56) References Cited

U.S. PATENT DOCUMENTS

| | | | | | |
|---|---|---|---|---|---|
| 7,952,490 | B2* | 5/2011 | Fechner | ............... | G06K 9/3241 340/901 |
| 8,078,356 | B2* | 12/2011 | Kano | ....................... | B60R 1/00 382/104 |
| 8,294,563 | B2* | 10/2012 | Shimoda | .................. | B60R 1/00 340/425.5 |
| 8,600,609 | B2* | 12/2013 | Holzmann | ............ | B60W 30/16 180/170 |
| 8,615,357 | B2* | 12/2013 | Simon | .................. | B60W 30/16 340/435 |
| 8,793,046 | B2* | 7/2014 | Lombrozo | ............ | B60W 40/00 701/117 |
| 2005/0023465 | A1* | 2/2005 | Eggers | ...................... | B60R 1/00 250/330 |
| 2005/0134479 | A1* | 6/2005 | Isaji et al. | ..................... | 340/901 |
| 2009/0067184 | A1* | 3/2009 | Kamioka | ............... | B60Q 1/085 362/464 |
| 2010/0033571 | A1* | 2/2010 | Fujita | ................... | B60W 40/02 348/149 |
| 2013/0251209 | A1* | 9/2013 | Kim | .................. | G06K 9/00825 382/106 |
| 2014/0321764 | A1* | 10/2014 | Zarom | .......................... | 382/243 |

FOREIGN PATENT DOCUMENTS

| | | |
|---|---|---|
| DE | 10 2004 055 285 | 6/2005 |
| DE | 10 2004 059 129 | 7/2005 |
| DE | 10 2004 029 985 | 1/2006 |
| DE | 10 2005 026 693 | 6/2006 |
| DE | 10 2008 006 951 | 9/2008 |
| FR | 2 742 284 | 6/1997 |
| FR | 2 864 311 | 6/2005 |
| GB | 2 394 076 | 4/2004 |
| JP | 03 012799 | 1/1991 |
| JP | 8-241500 | 9/1996 |
| JP | 11-39597 | 2/1999 |
| KR | WO 2008066241 A1 * 6/2008 ....... G08G 1/096716 |  |
| WO | WO 2008146304 A2 * 12/2008 |  |

* cited by examiner

METHOD AND DEVICE FOR DETECTING A BRAKING SITUATION

FIELD OF THE INVENTION

The present invention relates to a method for detecting a braking situation of vehicles located on a traffic route and to a corresponding device.

BACKGROUND INFORMATION

Various proximity-control systems suitable for vehicles exist, based on radar. The scope ranges from warning functions (FCW, Forward Collision Warning) via speed controlling systems in the comfort range (ACC, Adaptive Cruise Control) to systems intervening with full deceleration (PBA, Predictive Brake Assist).

It is believed to be common to these systems that a radar sensor is able to measure directly the distance and the relative motion from one or more preceding vehicles.

German document DE 102 54 806 B4 refers to a method for information processing of at least two information sources in a motor vehicle.

SUMMARY OF THE INVENTION

Against this background, the present invention provides a method for detecting a braking situation in vehicles located on a traffic route, and also a device which uses this method and finally, a corresponding computer program product according to the main claims. Advantageous refinements are derived from the respective dependent claims and the following description.

The present invention is based on the recognition that, by evaluating a red component of an image that is depicting a traffic situation, the braking of a vehicle participating in the traffic situation is also able to be recognized, based on the image, when the vehicle or the braking lights of the vehicle are not depicted by the image. In this way, the end of a traffic jam or a braking column of vehicles is able to be recognized via the red component in the image or in a section of the image.

It may therefore advantageously be detected whether a vehicle column is braking. A "column brake signal" may be generated as a function of whether the vehicle column is braking or not. This yields a situation detection. If a function such as FCW or ACC is receiving the column brake signal, this function is able to adapt parameters used to the column brake signal. For example, a warning threshold used by the function may be reduced or the distance from preceding vehicles may be increased.

In this way, for example, a video camera of a vehicle may be utilized for functions or systems so as to be able to react to braking vehicles in a more foresighted way, even before the preceding vehicle has initiated a braking process. In this context, these systems do not necessarily have to be pure video systems. The column brake signal generated by the video camera may also be used in the case of radar systems, lidar systems, PMD (Photonic Mixer Device) systems, or ultrasonic systems, for example.

The present invention creates a method for detecting a braking situation of a vehicle located on a traffic route, which includes the following tasks:

ascertaining a red component at least of an image area of an image, which depicts at least one section of the traffic route; and determining the braking situation based on the red component.

The traffic route may be a road having one or more lanes. The vehicle may be a passenger car or a truck, which are traveling or standing still on a section of the traffic route. The vehicles may be traveling in a column, so that when one is viewing the section of the traffic route in the traveling direction of the vehicles, further forward traveling vehicles are completely or partially covered by further backward traveling vehicles. The braking situation includes information on a braking process of all vehicles, of some vehicles or of one vehicle located in the section. By braking process one may understand an active braking of the vehicle, using a braking device of the vehicle, indicated by a braking light of the vehicle. Consequently, the braking situation may characterize, for instance, a situation in which no vehicle located in the section of the traffic route is carrying out a braking process, or it may characterize a situation in which at least one vehicle located in the section of the traffic route is carrying out a braking process. Information on a braking situation may be output via an interface.

For example, the information concerning the braking situation may trigger a warning or it may be used by driver assistance systems. In the case of a column of at least two vehicles traveling one behind the other, the vehicle carrying out the at least one braking process may be located ahead of the rear vehicle of the column. The image may represent an image that was taken by an image-taking device, such as a video camera. The image-taking device may be aligned so that it records the section of the traffic route in the direction of travel of the vehicle located in the section. The image-taking device may be situated on a vehicle and aligned in such a way that it records the section of the traffic route extending in the travel direction ahead of the vehicle, on which the vehicle is located. Alternatively, the image-taking device may be a part of an infrastructure of the traffic route. The image-taking device may be aligned so that the image depicts a complete backward view of the section of the traffic route or one or more predetermined segments of the backward view of the section. The at least one image area may include a predetermined or currently ascertained segment of the image. If the image range is currently being ascertained, the image may be evaluated using an image evaluation with respect to previously determined features, which may refer, for example, to the traffic route or vehicles, and the image range may be selected as a function of a result of the image evaluation.

The image range may include a plurality of image points. The red component may be higher, the greater the proportion of red image points having a certain intensity in the image range. The red component may depend, on the one hand, on the planar distribution of the color red and, on the other hand, on the intensity of the color red in the image range. The red component may be greater, the more long wavelength light falls on the light-sensitive surface. A relative red proportion may also be ascertained by a comparison of the intensity of the overall incident light to the proportion of long wavelength light. What is advantageous in the specific embodiment is the independence of the red proportion of the incident overall intensity of the light.

According to one specific embodiment, the section may represent a section of the traffic route located ahead of a vehicle. In this case, the image may have been taken by a camera of the vehicle, and the method may be carried out in a suitable device of the vehicle. A warning may be output to the driver of the vehicle as a function of the information on the braking situation. The information on the braking situation may also flow into an algorithm of a system, for instance, a driver assistance system of the vehicle.

In the task of ascertaining, the red proportion of an image range of the image may be ascertained which depicts a roadway surface of the traffic route. On the roadway surface, the red light radiated from a braking light of a vehicle is reflected. By the evaluation of the red proportion of the light reflected by the roadway surface, one may therefore conclude on there being a vehicle in the vicinity of the evaluated area of the roadway surface, whose brake lights are activated. By the recording and evaluation of reflected light, one may also use light from covered braking lights to determine the braking situation. By a covered braking light, a braking light may be understood which is not depicted by the image, for instance, because an additional vehicle or an object is located in the direct optical path of the braking light to the image-taking device.

Alternatively or in addition, in the task of ascertaining, the red proportion of an image range of the image may be ascertained which depicts a roadway limitation of the traffic route. A roadway limitation may, for instance, be a guardrail, a concrete demarcation at construction sites, a wall, a curb, a road shoulder, or an adjacent lane, as well as a vehicle located on an adjacent lane. Corresponding to the roadway surface, the light radiated by a brake light is also reflected on a roadway limitation, and is able to be recorded by the image-taking device.

The method may include a task of determining the image segment of the image that depicts a vehicle. In a task of selecting the at least one image range, the at least one image range may be selected as a range of the image segment located outside the image segment depicting the vehicle. The vehicle may be a vehicle located directly or within a predetermined maximum distance ahead of the image-taking device. In particular, it may be a vehicle whose brake lights are located within the visual range of the image-taking device. A recess of the image range which images this vehicle may be meaningful, since in that case no reflections are to be expected of brake lights from vehicles located in front of this vehicle. If one is able to see through a vehicle, for instance, through a rear window and a windshield, the evaluation of a corresponding image range with respect to a red component may again be meaningful, since such an image range is able to include light information of brake lights of vehicles traveling farther ahead.

In the task of ascertaining, the red component may be ascertained as an absolute red component and/or a relative red component of the at least one image range. For example, the red component of an image range of a single image may be evaluated. If the red component exceeds a threshold value, a situation having at least one braking vehicle may be determined as the braking situation. By contrast, if the red component is below the threshold value, a situation without braking vehicles may be determined as the braking situation. The threshold value may be able to be set, and be set as a function of environmental conditions, such as the environmental brightness or the weather. The red component may also be compared to a plurality of different threshold values, in order to be able to specify the braking situation more exactly. In the same way as the red component, the relative red component may also be used, normalized, for example, to the brightness of the image range.

The method may include a task of ascertaining an additional red component at least of an image range of a further image. The further image may depict at least one section of the traffic route at a different time than the image. In the task of determining, the braking situation may be determined based on the red component and the additional red component. Consequently, the change in the red component is able to be evaluated, for example, in two images taken consecutively in time by the same image-taking device. If the red component is larger in the image taken later than in the image taken previously, this points to a braking maneuver of a vehicle. If the red component is smaller in the image taken later than in the image taken previously, this points to an ending of the braking maneuver of a vehicle. In order to determine the braking situation, based on a change in the red component, over two or more images, a suitable threshold value may in turn be used. As image ranges, different image ranges may be selected or always the same image range. Especially when the course of the road and the vehicles traveling relatively to one's own vehicle do not change, the same image range may be selected. If the red components of two images are compared to each other, this may thus involve the same segment. Different or the same traffic routes may also be involved.

The method is able to include a task of detection of a braking light of a vehicle depicted by the image. In one task of determining, a further braking situation may be determined as a function of the braking light. If the braking light is recognized as an actively glowing braking light, the additional braking situation may include information on the fact that a vehicle located directly in front of the one equipped with the image-taking device is carrying out a braking maneuver. If the braking light is recognized as a actively glowing braking light, the additional braking situation may include information on the fact that a vehicle located directly in front of the one equipped with the image-taking device is carrying out a braking maneuver. The braking situation and the further braking situation may differ. For instance, the braking situation may already be indicating a braking maneuver of a vehicle located further forward in a column, while the further braking situation does not yet indicate a braking maneuver, since the vehicle located further back, whose brake lights are being recorded directly, is not yet carrying out a braking maneuver. Information on the further braking situation may be utilized with respect to the information on the braking situation, for triggering a warning, or by a driver assistance system. In this context, the information on the further braking situation and the information on the braking situation may be combined with each other.

The present invention further creates a device for detecting a braking situation of a vehicle located on a traffic route, which is developed to carry out or implement the tasks of the specific embodiments of the method named before in the appropriate devices. This embodiment variant of the present invention in the form of a device may also be used quickly and efficiently to achieve the object on which the present invention is based.

In the case at hand, by a device one may understand an electrical device which processes sensor signals and outputs control signals as a function thereof. The device may have an interface developed as hardware and/or software. In a hardware implementation, the interfaces may be part of a so-called system ASIC, for instance, which contains various functionalities of the device. However, it is also possible for the interfaces to be characteristic, integrated switching circuits or to be at least partially made up of discrete components. In a software development, the interfaces may be software modules which are present on a microcontroller, in addition to other software modules, for example.

A computer program product is also of advantage, having program code that may be stored on a machine-readable carrier such as a semiconductor memory, a hard-disk memory or an optical memory, which is used to implement the method according to one of the specific embodiments described above, when the program is run on a computer or a device.

In the following text, the present invention will be explained in greater detail by way of example with reference to the attached drawing.

DETAILED DESCRIPTION

Figure 1:
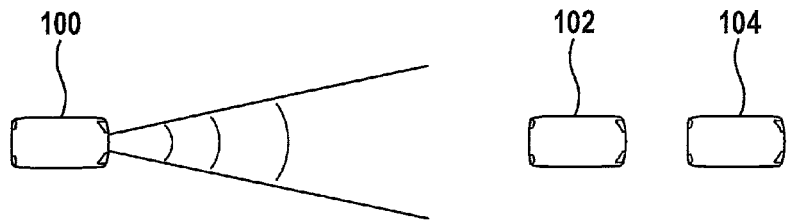
FIGS. 1, 2 and 3 show schematic representations of traffic situations.

In the subsequent description of exemplary embodiments of the present invention, the same or similar reference numerals are used for the elements that are shown in the various figures and act similarly, so that a repeated description of these elements has been dispensed with.

FIG. 1 shows a schematic representation of a traffic situation having vehicles 100, 102, 104 located on a traffic route. Vehicles 100, 102, 104 are traveling one behind the other in a common direction. The travel direction is from left to right. Vehicle 102 is traveling at a short distance behind vehicle 104. Vehicle 100 is following vehicle 102 at a greater distance. Vehicle 100 is equipped with a device for distance measurement. The device is developed for carrying out a distance measurement from a preceding vehicle 102 and from preceding vehicle 104, if necessary. The device for distance measurement, such as a radar sensor, is able to measure directly the distance and the relative motion from preceding vehicle 102 and, because of a low installation position, partially all the way through under this vehicle 102, also the distance of vehicle 104 that is traveling even farther ahead.

Figure 2:
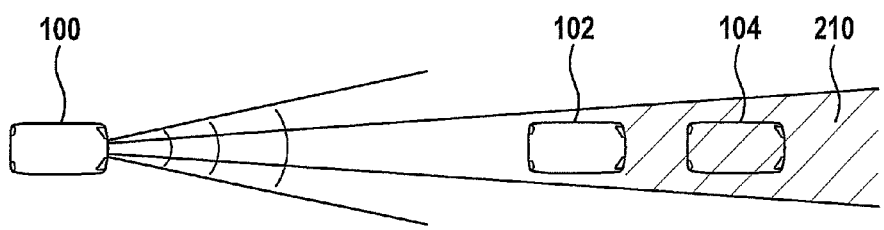

FIG. 2 shows a schematic representation of a further traffic situation having vehicles 100, 102, 104 located on a traffic route, according to one specific embodiment of the present invention. The traffic situation corresponds to the traffic situation shown in FIG. 1. According to this exemplary embodiment, vehicle 100 is equipped with an image-taking device, for instance, a camera. In addition, the vehicle may have the device for distance measurement described with the aid of FIG. 1.

Because of the ever greater degree of penetration of video cameras in the vehicle, e.g. by high-beam assistants and/or lane keeping assistants, the longitudinally guiding functions, which were originally implemented using radar, may now be implemented, or at least supported using a video camera.

A video camera takes the scene ahead of the vehicle using an image converter or imager, which besides brightness information, the so-called "gray value", is also able to evaluate color information, particularly red. In this context, a so-called R3I imager may be involved. Of every four image points or pixels, three pixels are intensity pixels without color filter, so-called "I pixels", and one pixel having a red filter. By an evaluation of the pixel provided with the red filter, an image plane may be detected which depicts a red range of an environment of the vehicle recorded by the camera. By a suitable evaluation, in this way the red component may be ascertained in the image provided by the imager. It has also proven advantageous to ascertain the red component relative to the measured intensity, whereby a normalized or relative red component is able to be ascertained. Because of the relative red component, the dependence of the absolute red component of the environmental brightness may be reduced.

The video camera may be installed behind the rear-view mirror, looking forwards, in vehicle 100, and take the scene in front of the vehicle shown in FIG. 2. The camera, for example, recognizes other vehicles 102 with the aid of the typical rear view. The distance, for example, is able to be estimated via scaling changes of the rear view, in contrast to radar, which is able to measure exactly from one physical variable. The distance from vehicle 104 traveling ahead of preceding vehicle 102 is not able to be measured by being obstructed by vehicle 102. In the case of radar, such a measurement would be partially possible because of the low installation position.

Building up on the distance estimation, in a similar way to radar, for example, warning or intervening functions are able to be implemented, such as FCW.

If such a function is implemented based on the distance estimate, there are certain delay times, since the distance estimation is relatively inaccurate compared to the radar measurement. In this case, a good situation interpretation is essential, in order to warn at the right time and to hold low the false alarm rate.

If vehicles 100, 102, 104 travel closely up to one another in a column, the danger of an accident rises, since braking interventions often turn out more strongly than in the case of sufficiently large spacing. The same is the case if one has to brake strongly unexpectedly from a high speed, for instance, at a poorly visible end of a traffic jam.

Furthermore, at night, the driver of vehicle 100 is able to estimate distances or the strength of brake interventions only with difficulty, since he only sees the lights or signal lights of vehicle 102, and is only able to sense the strength of a brake intervention via the distance change of the lights. During the day, a person also tends to use the strength of the pitching motion of other vehicles in order to conclude on the strength of a braking intervention.

At night, the camera finds it difficult to estimate distances, since objects "vanish" in the dark. In the same way, bad weather reduces visibility conditions.

In FIG. 2, vehicle 100 equipped with the camera travels in or behind a column. The camera of vehicle 100 views the travel direction and records the field ahead of the vehicle. A viewing angle of the camera is indicated by the outer lines extending away from vehicle 100. In the case of straight lines, the camera is able to detect exclusively last vehicle 102, since vehicle 104 preceding it is covered. In a section 210 of the traffic route, the camera is "blind", since this section 210 is covered by vehicle 102.

This means that vehicle 104, located in section 210, is not able to be detected in an image taken by the camera.

When vehicle 104 brakes, vehicle 102 will presumably also brake. Depending on the speed of the host vehicle and the distance of vehicle 100, it must subsequently also brake, in order to avoid a collision with vehicle 102.

For distance-regulating or distance-warning systems in vehicle 100, without the use of a suitable method, one is able to react exclusively to the behavior of vehicle 102, since vehicle 104 is covered out of sight of vehicle 100. However, since the behavior of vehicle 102 depends on the behavior of vehicle 104, it is useful to include the behavior of vehicle 104 in the system behavior of the systems of vehicle 100.

Each vehicle 100, 102, 104 is equipped with red braking lights, which are activated upon the activating of the brake. To be sure, the brake lights of vehicle 104 are covered by vehicle 102, but the red light of the brake lights of vehicle 104 is reflected by the surroundings and is able to be perceived by the camera in vehicle 100, as shown in FIG. 3.

Figure 3:
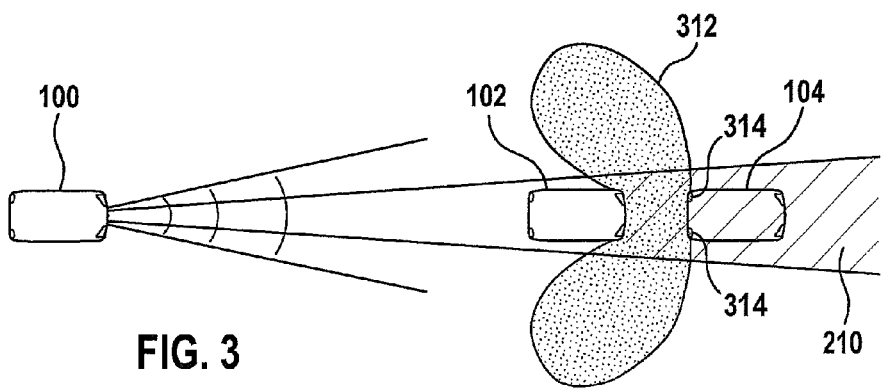

FIG. 3 shows a schematic representation of a further traffic situation having vehicles 100, 102, 104 located on a traffic route, according to one specific embodiment of the present invention. The traffic situation corresponds to the traffic situation shown in FIG. 2. Vehicle 100 is, in turn, equipped with an image-taking device, for instance, a camera. Vehicle 104, is located again in section 210 of the traffic route that is covered by vehicle 102.

In FIG. 3, red reflections 312 are shown from brake lights 314 of vehicle 104. Reflection 312 of red brake light 314 from vehicle 104 typically corresponds to reflections during column travel. Some of reflections 312, which are located at the side of vehicle 102, are visible in the view of the driver or the camera.

Reflections 312 are caused by an activation of brake lights 314 based on a braking process of vehicle 104. The braking process of vehicle 104 is able to be perceived by reflections 312 of brake lights 314, by the camera in vehicle 100, even before vehicle 102 reacts to the braking process of vehicle 104. Information on the braking process of vehicle 104 or generally on a braking situation of vehicle 104 located in a column in front of vehicle 102 is able to be gained by an evaluation of the image taken by the camera of vehicle 100. This information is able to be utilized by an assistance system of vehicle 100. An assistance system of vehicle 100 is thereby able to react presciently to the potential braking process of vehicle 102.

The evaluation of the camera image of the camera of vehicle 100 may be limited to individual areas, in which reflections 312 are most probable to appear. Such areas may be situated, for example, directly on the roadway, round about vehicle 102 or at an edge-of-the-road development.

Figure 4:
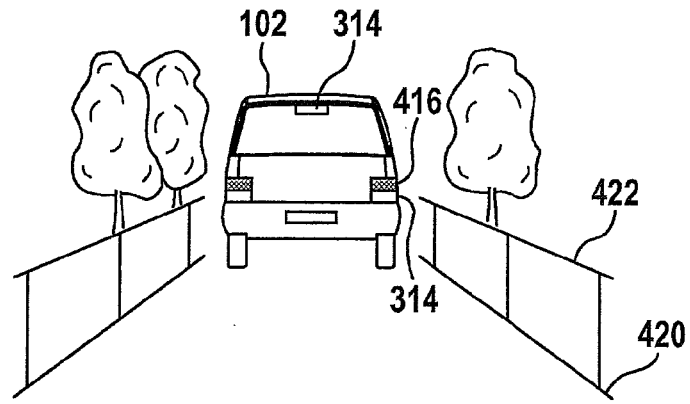
FIGS. 4, 5 and 6 show representations of a section of a traffic route.
Figure 5:
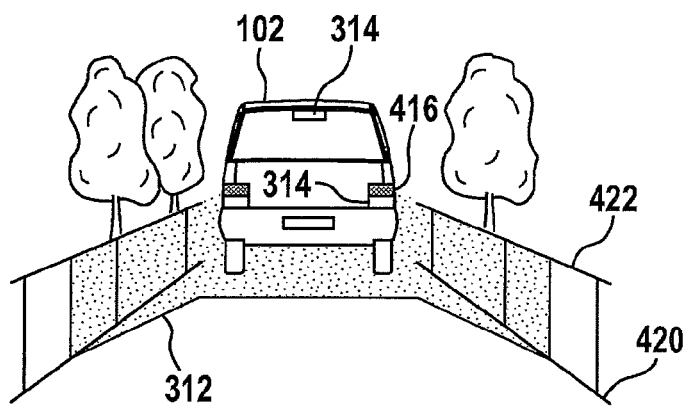
Figure 6:
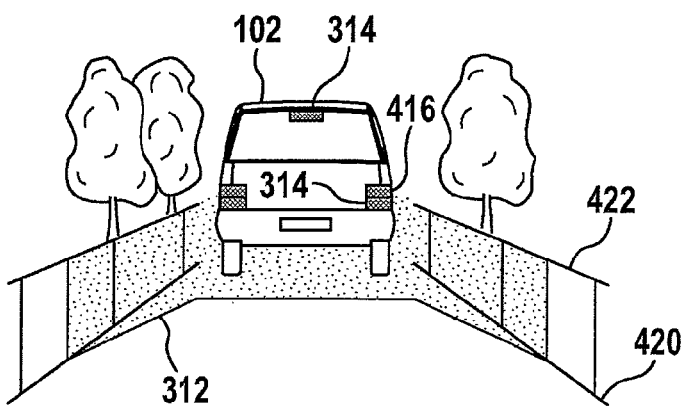

FIGS. 4 through 6 show representations of a section of a traffic route as seen by the driver of a vehicle or a camera of the vehicle looking ahead, according to the exemplary embodiments of the present invention. What is shown is a rear view of a preceding vehicle 102 traveling on a road 420. Road 420 is bounded on both sides by a raised lateral roadway border 422. Vehicle 102 has three brake lights 314 and two rear lights 416. Vehicle 102 may be vehicle 102 shown in FIGS. 1 through 3, which, based on the braking process shown in FIG. 3 of a braking process of a preceding vehicle 104, is also forced to carry out a braking process. The preceding vehicle, that is located in front of vehicle 102, is not shown in FIGS. 4 through 6. The view shown in FIGS. 4 through 6 may correspond to a view of the driver of vehicle 100 shown in FIGS. 2 and 3. Vehicle 100 is not visible in FIGS. 4 through 6. Consequently, FIGS. 4 through 6 are not able to show a sequence of the traffic situation shown in FIGS. 2 and 3 from the view of the driver or the view of the camera of vehicle 100. The representations may correspond in each case to an image taken by a camera of vehicle 100, which is able to be evaluated in order to determine a braking situation in the respective traffic situation.

FIG. 4 shows a situation of vehicle 102 and of the vehicle located in front of vehicle 102, in which none of the vehicles is carrying out a braking process. Therefore, the red component of the image shown in FIG. 4 is very slight. Only the rear lights 416 of vehicle 102 glow red. In order to prevent a false interpretation of the red color of rear lights 416, suitable thresholds may be drawn upon for the evaluation of the red component of the image. Then too, the image area which depicts rear lights 416 may be excluded from the evaluation of the red component. For this purpose, the image may be submitted to a suitable image evaluation or object detection by which, on the one hand, image area may be ascertained which are suitable for determining the braking situation and, on the other hand, image areas are able to be ascertained which are not suitable for determining the braking situation.

FIG. 5 shows a braking situation of vehicle 102 and of the vehicle located ahead of vehicle 102 in which the vehicle located ahead of vehicle 102 is carrying out a braking process. The directly preceding vehicle 102 is not (yet) braking, but brake light illumination 312 from the vehicle ahead of it is becoming visible. This makes for a high probability that preceding vehicle 102 will also brake.

The light radiated by the braking lights of the vehicle located ahead of vehicle 102 is reflected on the surface of road 420 and roadway limitation 422. An image of reflection 312 in the image shown in FIG. 5 leads to an increased red component, in comparison to the image in FIG. 4. In particular, the surface of road 420 as well as the roadway limitation next to, and behind vehicle 102 has a red coloration. To determine the braking situation, the red component of the entire image shown in FIG. 5 may be evaluated. Alternatively, only one image area may be evaluated, such as an image area which images the surface of road 420 or roadway limitation 422. To determine the braking situation, the image shown in FIG. 5 may be evaluated by itself alone. Additionally or alternatively, the image shown in FIG. 5 may be compared to the image shown in FIG. 4 that was recorded previously in time, in order to obtain information on a change in the red component of the images. At this point, an abrupt increase in the red component takes place between the images shown in FIGS. 4 and 5, especially in the area of road 420 and roadway limitation 422, which are located in the vicinity of vehicle 102.

FIG. 6 shows a braking situation of vehicle 102 and of the vehicle located ahead of vehicle 102, in which both the vehicle located ahead of vehicle 102 and vehicle 102 are carrying out a braking process. Based on the braking process of vehicle 102, brake lights 314 of vehicle 102 are glowing. The braking process of vehicle 102 may be detected separately as an additional braking situation, for instance, via a direct measurement, such as described with the aid of FIG. 1, or via a suitable image evaluation which, for example, is evaluating a size change in vehicle 102 in successive images or a lighting up of braking lights 416.

A column brake signal, which includes information on a braking situation of vehicles moving in a column, may be produced, for instance, by evaluating the absolute red component and the red component change of an image section or of image areas of, for example, the images shown in FIGS. 4 through 6.

By evaluating the red component, a traffic jam end in flowing traffic may also be detected, for example. If the distance is great enough, the brake lights are poorly able to be classified as such. However, at the end of the traffic jam, all preceding vehicles brake almost simultaneously or shortly after one another. The red component in the image or the image area thereby becomes greater.

The approach according to the present invention may be used in the case of distance regulating or distance warning systems, such as FCW or (video) ACC for detecting the situation. For this purpose, the column brake signal or information on the braking situation may be supplied to a corresponding system, and used by the system for decision finding. The column brake signal or information on the braking situation may also be used in light systems such as AHC (=Adaptive High Beam Control; a flowing transition of the bright-dark border between low beam and high beam, related to illumination distance regulation) for predictive adaptation of the safety distance or the safety angle.

The reflections are able to be perceived especially well at night and/or on wet roads. At night, the environmental brightness is slight, whereby low light intensities (or light reflections) may be resolved better. When the roadway is wet, the road has good reflection properties, whereby more red light is able to arrive in the camera than when the road is dry. In the same way, the reflection from guardrails and concrete demarcations at construction sites is easy to recognize.

Figure 7:
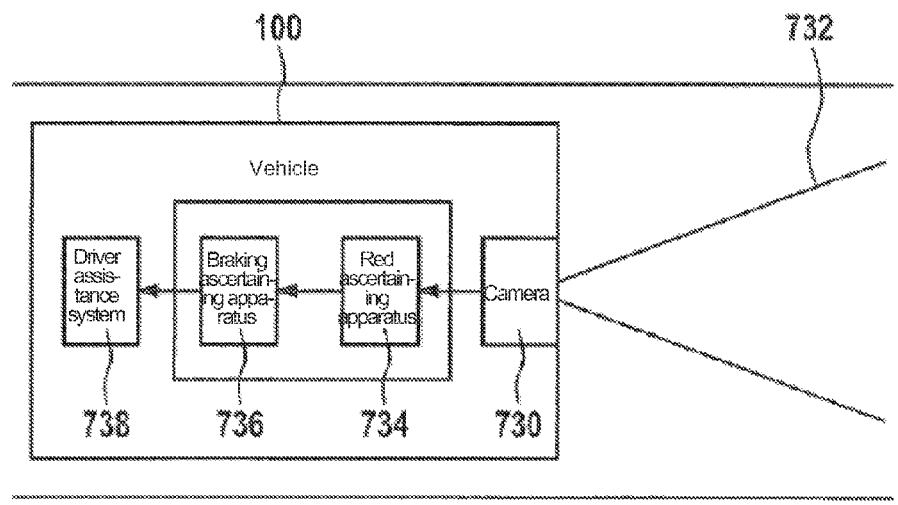
FIG. 7 shows a schematic representation of a vehicle having a device for detecting a braking situation.

FIG. 7 shows a schematic representation of a vehicle 100 having a device for detecting a braking situation from vehicles located on a traffic route 420, according to an exemplary embodiment of the present invention. Vehicle 100 may be, for instance, the vehicle shown in FIGS. 1 through 3.

Vehicle 100 has a camera 730, which is developed to image a section 732 of traffic route 420, located ahead of vehicle 100, as an image. The image may correspond to one of the images shown in FIGS. 4 through 6. The device for detecting the braking situation has an apparatus 734 for ascertaining a red component and an apparatus 736 for determining the braking situation. Apparatus 734 is developed to receive the image, or an image section of the image taken by camera 730, via a suitable interface, and to ascertain a red component of the image or an image area of the image. Apparatus 734 is developed to provide information on the red component to apparatus 736, for determining the braking situation. Apparatus 736 is developed to determine information on a braking situation of the traffic situation depicted in the image, based on the red component. Vehicle 100 may have a driver assistance system 738. Driver assistance systems 738 may be developed to receive information on the braking situation from apparatus 736 via a suitable interface and, while using the information on the braking situation, to carry out or adjust a driver assistance function.

Figure 8:
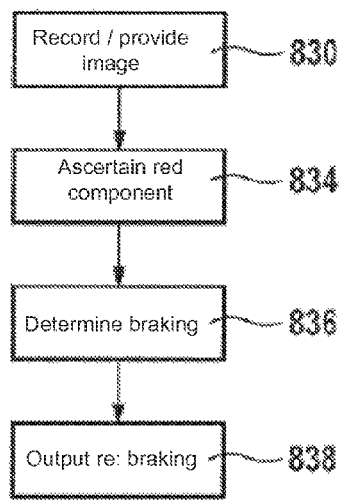
FIG. 8 shows a flow chart of a method for detecting a braking situation.

FIG. 8 shows a flow chart of a method for detecting a braking situation of vehicles located on a traffic route, according to an exemplary embodiment of the present invention. The method is able to be carried out by the apparati of the vehicle shown in FIG. 7, for example. In a task 830, there takes place the recording of an image by a camera or the providing of an image already recorded by a camera. In a task 834, the ascertaining takes place of a red component of at least one image area of the image. In a task 836 the determining of the braking situation takes place, based on the red component. In a task 838, information is able to be output on the braking situation.

The exemplary embodiments described and shown in the figures have been selected merely as examples. Different exemplary embodiments are combinable with one another, either completely or with regard to individual features. An exemplary embodiment may also be supplemented by features from another exemplary embodiment. Furthermore, method tasks according to the present invention may be carried out repeatedly and also performed in a sequence other than the one described. If an exemplary embodiment includes an "and/or" linkage between a first feature and a second feature, this may be understood to mean that the exemplary embodiment according to one specific embodiment has both the first feature and the second feature, and according to an additional specific embodiment, either has only the first feature or only the second feature.

What is claimed is:

1. A method comprising:
   obtaining, by processing circuitry of a first vehicle, an image of a route in front of the first vehicle in which a second vehicle is located in columnar line with, and between, the first vehicle and a third vehicle, which is not imaged in the obtained image;
   processing, by the processing circuitry, the obtained image to ascertain a red component within the image, which red component does not include lighted braking lights;
   identifying the ascertained red component, by the processing circuitry, as a reflection of light from a braking light of the third vehicle that is not imaged in the obtained image; and
   the processing circuitry at least one of outputting a warning and controlling a motion of the first vehicle in response to the identification of the reflection of the light from the braking light of the third vehicle.

2. The method of claim 1, wherein the red component identified as the reflection is in an area of the image that depicts a roadway surface of the route.

3. The method of claim 1, wherein the red component identified as the reflection is in an area of the image that depicts a barrier at a side of a roadway of the route.

4. The method of claim 1, wherein the red component is ascertained as at least one of an absolute red component and a relative red component of the image.

5. The method of claim 1, further comprising:
   ascertaining an additional red component within an additional image of the route at a different time than that to which the image corresponds, wherein the identifying of the red component as the reflection of light from the braking light of the third vehicle is based on the red component and the additional red component.

6. The method of claim 1, wherein the identifying is based on a determination that the red component exceeds a threshold value.

7. The method of claim 6, further comprising setting the threshold value as a function of an environmental condition.

8. The method of claim 1, wherein the identifying includes comparing the red component to each of a plurality of threshold values.

9. The method of claim 1, wherein the second vehicle, which blocks the third vehicle from being imaged in the image, is imaged in the image.

10. The method of claim 9, further comprising, based on another red component, identifying, by the processing circuitry, a braking by the second vehicle.

11. The method of claim 1, wherein the red component identified as the reflection is in an area of the image that depicts a side of a body of a fourth vehicle in a lane of a roadway of the route that is adjacent to a lane of the first, second, and third vehicles, the side of the body of the fourth vehicle not including any brake lights.

12. A device comprising:
   an imaging device of a first vehicle; and
   processing circuitry of the first vehicle that is in communication with the imaging device, wherein the processing circuitry is configured to:
      obtain from the imaging device an image of a route in front of the first vehicle in which a second vehicle is located in columnar line with, and between, the first vehicle and a third vehicle, which is not imaged in the obtained image;

process the obtained image to ascertain a red component within the image, which red component does not include lighted braking lights;

identify the ascertained red component as a reflection of light from a braking light of the third vehicle that is not imaged in the obtained image; and at least one of output a warning and control a motion of the first vehicle in response to the identification of the reflection of the light from the braking light of the third vehicle.

13. A non-transitory computer readable medium on which is stored a computer program that is executable by a processor of a first vehicle, and, when executed by the processor, causes the processor to perform a method, the method comprising:

obtaining, from an imaging device of the first vehicle, an image of a route in front of the first vehicle in which a second vehicle is located in columnar line with, and between, the first vehicle and a third vehicle, which is not imaged in the obtained image;

processing the obtained image to ascertain a red component within the image, which red component does not include lighted braking lights;

identifying the ascertained red component as a reflection of light from a braking light of the third vehicle that is not imaged in the obtained image; and at least one of outputting a warning and controlling a motion of the first vehicle in response to the identification of the reflection of the light from the braking light of the third vehicle.

* * * * *